Dec. 10, 1968  O. E. BASSETT ET AL  3,415,972
MULTIPLE POINT AUTOMATIC WELDER
Filed Dec. 31, 1964  2 Sheets-Sheet 2

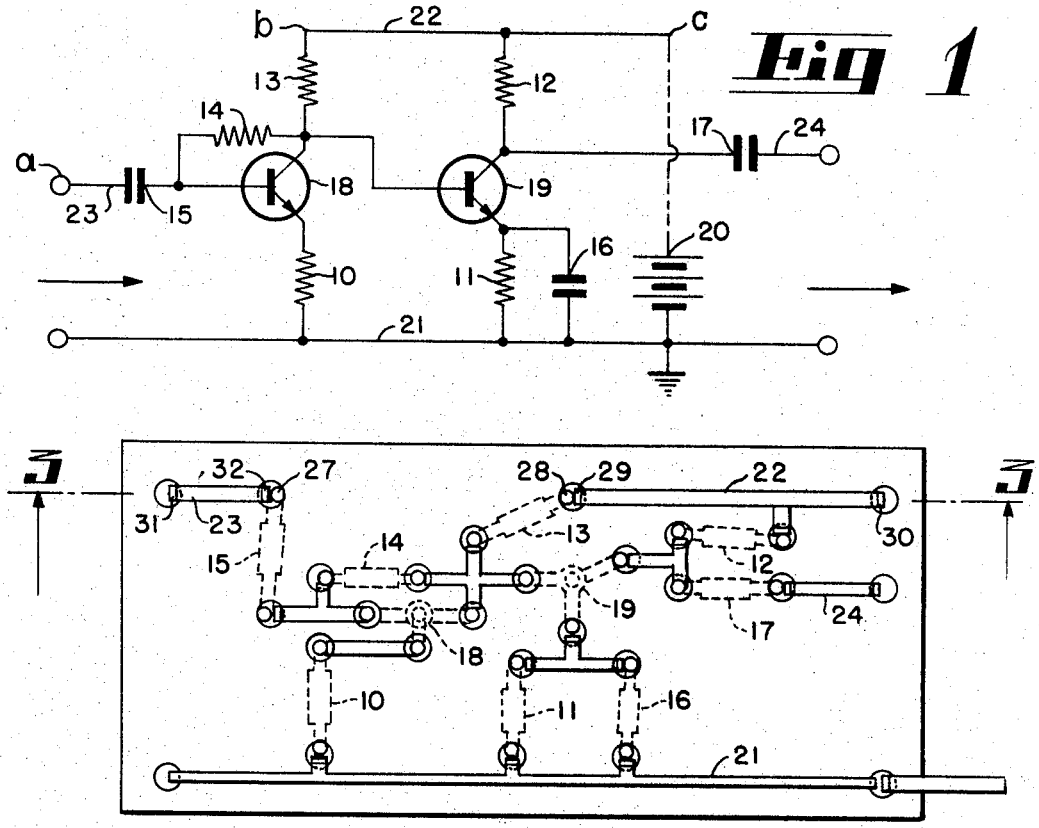
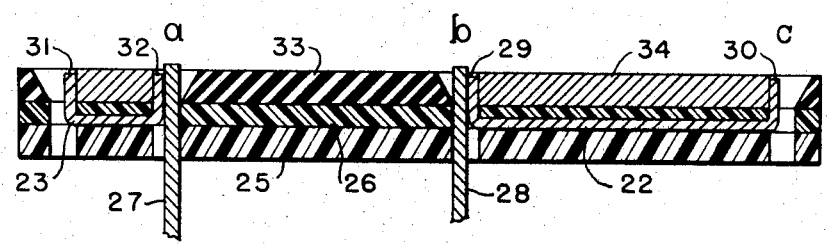

INVENTORS.
ORMON E. BASSETT
GEORGE BRUCK
BY Alden D. Redfield
Charles M. Hogan
ATTORNEYS.

United States Patent Office 3,415,972
Patented Dec. 10, 1968

3,415,972
MULTIPLE POINT AUTOMATIC WELDER
Ormon E. Bassett and George Bruck, Cincinnati, Ohio, assignors to Avco Corporation, Cincinnati, Ohio, a corporation of Delaware
Filed Dec. 31, 1964, Ser. No. 422,665
2 Claims. (Cl. 219—78)

ABSTRACT OF THE DISCLOSURE

An apparatus for gang welding a plurality of connection elements to a conductive terminal pattern includes a template for receiving welding electrodes and the parts to be welded. The template comprises insulative portions and electric return circuit portions arranged so that the connection elements and projections of the conductive pattern are received in apertures formed between the adjacent portions. Welding electrodes are aligned with the apertures to be brought into electrical contact with the parts to be welded. Beveled edges on the insulative portions serve to direct the electrodes to compress the parts to be welded against the return circuit portions and a sequential pulsing circuit serves to provide current to the plural electrodes.

---

The present invention relates to welding, and it features a novel process and apparatus for quickly accomplishing a multiplicity of welds. The invention is of particular utility in the fabrication of modules used in various electronics applications.

The principal object of the invention is to provide a novel multiple joint resistance welder characterized by the following advantages: high speed, single-shot workpiece positioning, simultaneity of placement of the electrodes, sequential group welding with a speed comparable to that required for making one weld, and efficiency in making positive electrical interconnections.

While the principles and general structure of the invention are of universal utility in the electrical arc welding art, they are of particular advantage in fine precision operations, such as those involved in microelectronics and circuit packaging. The preferred embodiment herein shown is employed, by way of illustration, for the automatic welding of lumped parameters to electric circuit boards employing plated or printed circuit patterns. The simplicity of the printed circuit board comprising the workpiece herein discussed is not intended to impose any limitation on the scope or applicability of this invention.

For a better understanding of the present invention, together with other and further objects, advantages, and capabilities thereof, reference is made to the following description of the accompanying drawings, in which:

FIG. 1 is a circuit schematic of the two-stage transistor circuit of a typical package with which the invention is employed;

FIG. 2 is a plan view of a circuit board or workpiece (on which there is superimposed a template of copper with insulating inserts, or purposes presently to be explained), this circuit board including terminals to which lumped parameters are to be welded;

FIG. 3 is an elevational sectional view of the FIG. 2 workpiece, taken along the section line 3—3 and looking in the direction of the arrows;

Figure 4:
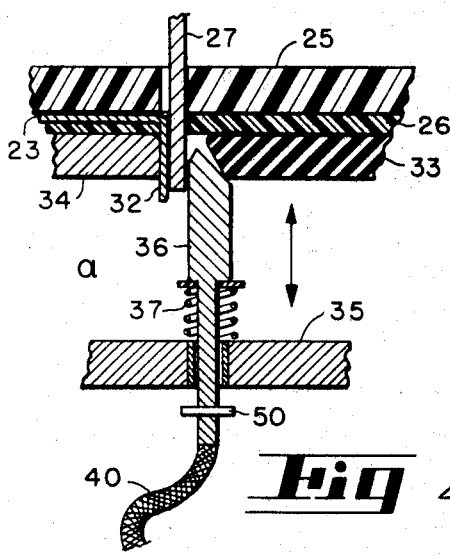
FIG. 4 is an elevational sectional view taken axially through one of several electrodes in the welding apparatus in accordance with the invention, together with the portion of the workpiece in registry therewith.

The circuit illustrated in FIG. 1 and included in the board of FIG. 2 is only illustrative. The circuit comprises resistors 10, 11, 12, 13, and 14; capacitors 15, 16, and 17; and transistors 18 and 19. Attention is particularly invited to the following connection points: (a) going into the input terminal of capacitor 15; (b) coming out of the high potential terminal of resistor 13; and (c) the circuit point which is connected to the positive terminal of B-battery 20. The epoxy portions 26 have been omitted from FIG. 2 for clarity in exposition, but they will be understood to be a part of the workpiece.

Referring now to the workpiece of FIG. 2, it will be observed that conductive circuit elements are provided on the workpiece as follows: ground conductor or bus bar 21, high potential direct current supply conductor or bus bar 22, input conductor 23, output conductor 24, and such other conductors as the FIG. 1 circuit requires.

Now referring to FIG. 3, the workpiece illustrated in FIG. 2 comprises an epoxy substrate 25 to which the elements of the circuit pattern, such as the elements 22 and 23, are firmly bound as by the encapsulating material 26. Note that FIG. 3 shows the lumped circuit parameter connections which are made at points (a), (b), and (c). Let us take point (a) for example, and assume that capacitor 15 carries a lead 27 as shown in FIG. 3, and further that resistor 13 carries a lead 28. It will be understood that lead 28 of resistor 13 is to be welded at point *b* to the conductor 22, that the lead 27 of the capacitor 15 is to be welded at point *a* to the conductor 23, and so on. The expression "and so on" means that all welded connections of the lumped parameters to the conductive circuit pattern elements of the printed circuit board of FIG. 2 may be made in this fashion.

Note is made of the fact that the elements of the conductive nickel circuit pattern inlaid in the board are formed with outwardly turned ends or termini, as illustrated at 29 and 30 in the case of the element 22, and at 31 and 32 in the case of the element 23. These termini project beyond the encapsulation. The function performed by the welder electrodes is electrically to weld together such members as 28 and 29, and 27 and 32. For this purpose there is superimposed on top of the workpiece a mask having such characteristics that each proposed welded junction is masked on the non-joined side by insulation 33 and adapted to be encircuited on the other (or joint) side by a conductive portion 34 of a template.

In FIG. 4 the workpiece of FIG. 3 is shown as inverted, and the disclosure relates to the process of welding conductor 23 to lead 27, for example. The element 35 in this figure is a pressure block which holds in resilient adjustable relation a plurality of spring-loaded electrodes such as that illustrated at 36, shown with a beveled metallic head spring-pressed between lead 27 and an insulating section 33 of the template. As indicated, element 36 is one of a plurality of electrodes carried by the pressure block 35, each of said electrodes being employed for making one connection—in this case the connection designated at (a). Electrode 36 projects through an aperture in block 35 and is shouldered against compression spring 37 so that the electrode is mounted as a biased plunger, limited by washer 50.

As explained above, it will be understood that a welded template which comprises the inlaid insulating sections 33 and a conductive body 34 (preferably copper) is positioned in appropriate relationship (copper on joint side) to all of the junctions to be welded. It will further be understood that all of the conductive element circuits, such as 23, are preferably made of nickel ribbon encapsulated in moldable epoxy 25, 26.

Figure 5:
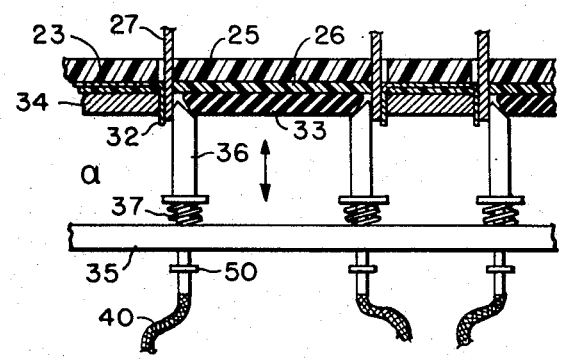
FIG. 5 is a skeleton view, generally in section, of a pressure block in accordance with the invention, carrying a plurality of welding electrodes in accordance with FIG. 4.

As previously stated, the pressure block 35 supports the required number of spring-loaded electrodes, such as 36, correctly positioned to strike each of the areas to be welded (see FIG. 5). The pressure block is made of a suitable nonconductive material. The movable electrodes such as 36, for example, are semi-floating in that block. The workpiece is clamped to a worktable, and the block 35 is raised up under the worktable so that the springs 37, etc., disposed in concentric relation to their respective electrodes 36, etc., press the electrodes against the workpiece. It will be understood to those skilled in the art that the workpiece is locked onto a worktable 38, which includes a quick-acting clamp powered by a suitable motor 39 (the worktable and clamp and motor not being shown otherwise than in the block diagram of FIG. 6). The operation is such that all of the electrodes are placed in position simultaneously, the pressure block being so arranged and controlled (by means well known to those skilled in the art) that it stops its upward movement on the attainment of a predetermined pressure or strain in the various springs 37, etc. When all of the electrodes are positioned, surge currents are passed through them in sequence, for welding purposes. The circuit for electrode 36 is traced from lead 41, arm 49, a contact 51, conductor 40, through electrode 36 and the metallic elements 27, 32, and template body 34 back to a common lead 52 from the controlled source of power 42.

Figure 6:
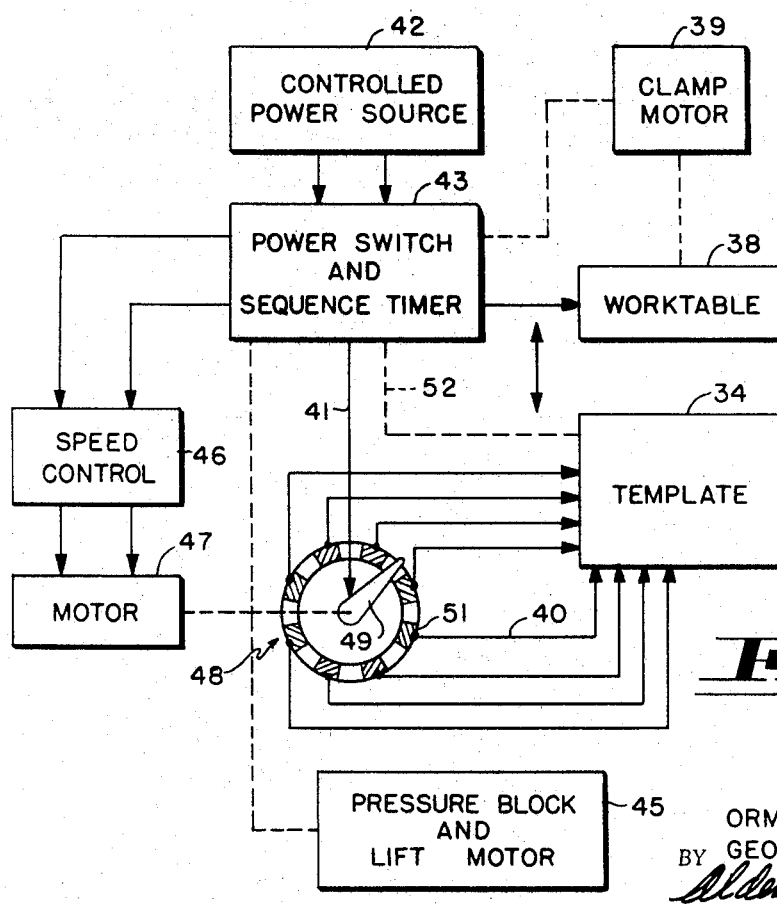
FIG. 6 is a system outline, primarily in block form, showing a mechanical and electrical control system used in conjunction with the invention.

While the invention may be operated in the manual mode, the FIG. 6 arrangement shows a system for automating the welder apparatus in accordance with the invention. It will be understood that the workpiece is first clamped on a worktable 38 in the position suggested by FIG. 4.

After the welding operations have been performed on a given workpiece, it is then unclamped. The clamping device per se on the worktable can be operated by a motor 39 which opens and closes the clamps as desired, all as controlled by a programming or sequence timing device included in block 43.

The block designated 45 is intended to encompass the pressure block or collective electrode holder 35, together with a suitable lift motor for actuating same. The timing of the lift motor is also controlled by the programming device 43, in such manner that when the workpiece is in place and grasped, the lift motor causes the pressure block 35 to be lifted until the pressure of the springs 37, etc., reaches the desired critical value, whereupon the pressure block is arrested and the sequence of welding operations begins. After the welding operations are concluded, then the lift motor is suitably timed and programmed to cause the pressure block 35 to be depressed into its relaxed position. The timer 43 operates in such a manner that, whenever the pressure block is in elevated position and the electrodes ready to function and in contact with the various junction elements which are to be welded, then the timer 43, acting via speed control 46 and motor 47, actuates a rotary switch which, in sequence, closes the various surge current lines 40 (one for each electrode) to a common bus bar 41 which is encircuited through a power switch in block 43 to the controlled power source 42. This switch 48 has a motor-actuated arm 49 in circuit with the common bus bar 41 and a plurality of symmetrically circular, segmentally arranged contacts individually in circuit with their respective electrode leads 40. Element 52 is the return bus bar from element 34 to the power source.

The template is made of copper or other suitable conductive material 34, formed to retain insulating inserts 33 as required.

Thus it will be seen that, in accordance with the invention, there has been provided a programming device, means responsive to the programming device for placing a workpiece in position to have welding operations performed thereon, an electrode carrier bearing a plurality of electrodes, means responsive to said programming device for moving the carrier to position all of the electrodes in welding position, and means for sequentially encircuiting all of said electrodes with a source of surge current, whereby the welding operations are performed, the first-mentioned means being responsive to said programming device to release the workpiece on which the welding operations have been performed.

It is reiterated that, in the practice of printed board fabrication in accordance with the invention, the workpieces are first made. The leads and lumped circuit parameters are then positioned mechanically loosely in place. The aggregate of workpiece and such parameters is then placed on the welder worktable, positioned, and clamped. The pressure block is then moved toward the worktable to apply the prescribed pressure between the various electrodes and the elements they are to weld. Then the current is switched on and applied in sequence to each electrode for the required welding period. Finally the current is switched off and the welding block is dropped.

While the term "arc welding" is employed herein and is in common usage in the literature, it will be understood that arcing does not in fact occur during the process of electrical welding. The metallic elements which are connected and fused are mechanically pressured together while the current is flowing.

While there has been shown and described what is at present considered to be the preferred embodiment of the invention, it will be understood by those skilled in the art that various changes and modifications may be made therein without departing from the scope of the invention as defined by the appended claims.

We claim:

1. Apparatus for welding a plurality of connection elements to their respective metallic terminals projecting from a circuit board conductive pattern, comprising:

releasable means for positioning a work piece comprising said circuit board and several connection elements disposed adjacent their respective terminals and in surface contact with said terminals;

a template formed with apertures and comprising metallic and insulating elements and positioned to provide a common circuit element in contact with all of said terminals and insulating masks adjacent said terminals, whereby each terminal and its associated connection element are positioned between said common circuit element and an insulating mask;

an electrode carrier;

a plurality of electrodes resiliently mounted on said carrier and projecting from the carrier in positions of substantial registry with said connection elements;

retractable means for advancing said carrier simultaneously to press the electrodes against the several connection elements to be welded, each electrode and the associated connection element and the associated terminal and the common circuit element provided by the template comprising a branch circuit;

and means for sequentially passing welding currents through the several branch circuits, each of said electrodes being individually beveled to be thrust between its associated connection and the insulating mask.

2. In a welding apparatus of the type in which an electrode is brought into contact with a pair of conductive elements to be welded together, and a welding current is routed through the electrode, the improvement comprising:
  a work positioning template apertured to position said pair and formed with an insulating abutment on one side of said pair and an electrically conductive return circuit element on the other side of said pair, the space between the abutment and the pair providing entry for said electrode.

References Cited
UNITED STATES PATENTS

| | | | |
|---|---|---|---|
| 2,194,687 | 3/1940 | Biederman | 219—111 X |
| 2,237,103 | 4/1941 | Lex | 219—111 X |
| 3,098,951 | 7/1963 | Ayer et al. | 29—626 |
| 3,151,278 | 9/1964 | Elarde | 29—626 |

RICHARD M. WOOD, *Primary Examiner.*
J. GREGORY SMITH, *Assistant Examiner.*